United States Patent
Park et al.

(10) Patent No.: US 8,998,493 B2
(45) Date of Patent: Apr. 7, 2015

(54) SPLIT COMBO BEARING

(71) Applicant: Korea Institute of Machinery & Materials, Daejeon (KR)

(72) Inventors: Cheol-hoon Park, Daejeon (KR); Sang-Kyu Choi, Daejeon (KR); Sung Hwi Lee, Daejeon (KR); Sang-Yong Ham, Daejeon (KR); Doo Euy Hong, Daejeon (KR); Tae Gwang Yoon, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 0 days.

(21) Appl. No.: 14/264,221

(22) Filed: Apr. 29, 2014

(65) Prior Publication Data

US 2014/0321779 A1 Oct. 30, 2014

(30) Foreign Application Priority Data

Apr. 30, 2013 (KR) ........................ 10-2013-0048490

(51) Int. Cl.
*F16C 17/04* (2006.01)
*F16C 17/26* (2006.01)
*F16C 17/10* (2006.01)

(52) U.S. Cl.
CPC ............... *F16C 17/10* (2013.01); *F16C 17/042* (2013.01)

(58) Field of Classification Search
CPC ...... F16C 17/02; F16C 17/042; F16C 37/002; F01D 25/166; F04D 25/062; F05D 2240/52
USPC ........................... 384/103, 105, 106, 124, 215
See application file for complete search history.

(56) References Cited

U.S. PATENT DOCUMENTS

| | | | | |
|---|---|---|---|---|
| 4,208,076 A | * | 6/1980 | Gray et al. | 384/105 |
| 4,296,976 A | * | 10/1981 | Heshmat | 384/99 |
| 4,621,930 A | * | 11/1986 | Gu et al. | 384/105 |
| 5,498,082 A | * | 3/1996 | Nadjafi | 384/105 |
| 5,540,505 A | * | 7/1996 | Struziak | 384/105 |
| 5,833,369 A | * | 11/1998 | Heshmat | 384/106 |
| 6,354,741 B1 | * | 3/2002 | Saville et al. | 384/106 |
| 6,752,533 B2 | * | 6/2004 | Saville et al. | 384/105 |

(Continued)

FOREIGN PATENT DOCUMENTS

| | | | |
|---|---|---|---|
| CA | 2218058 A1 * | 10/1996 | ............. F16C 32/06 |
| EP | 2187072 | 5/2010 | |

(Continued)

OTHER PUBLICATIONS

Kim, Tae Young, Korea University, Enhancement on Damping Characteristics of the Air Foil Bearings with Metal Mesh Structure (Dec. 2012) (English Abstract on p. 4).

*Primary Examiner* — Marcus Charles
(74) *Attorney, Agent, or Firm* — Lexyoume IP Meister, PLLC (57) ABSTRACT

A split combo bearing including a damper body that has a through-hole through which a rotor shaft passes, a cover that covers both axial sides of the damper body and a predetermined area of the outer circumference of the damper body, a thrust bump that is fixed to the side of the cover, which is in contact with the impeller on a rotor shaft, and is arranged circumferentially around the through-hole, a thrust top foil that is axially fixed to the outermost side of the thrust bump, and a radial top foil that is formed to cover the rotor shaft, and is disposed between the outer side of the rotor shaft and the inner side of the through-hole of the damper body.

10 Claims, 7 Drawing Sheets

(56) References Cited

U.S. PATENT DOCUMENTS

| | | | |
|---|---|---|---|
| 7,948,105 B2* | 5/2011 | Agrawal et al. | 384/105 |
| 2003/0169951 A1* | 9/2003 | Nishijima et al. | 384/103 |
| 2009/0039740 A1 | 2/2009 | Sortore | |
| 2011/0243762 A1* | 10/2011 | Daikoku et al. | 384/105 |

FOREIGN PATENT DOCUMENTS

| | | | | |
|---|---|---|---|---|
| JP | 2004-183830 | | 7/2004 | |
| JP | 2008157232 A | * | 7/2008 | |
| JP | 2011017385 A | * | 1/2011 | F16C 27/02 |
| KR | 10-2001-0063915 | | 7/2001 | |
| KR | 100760626 B1 | * | 9/2007 | F16C 27/02 |
| KR | 100760629 B1 | * | 9/2007 | F16C 17/03 |
| KR | 100868897 B1 | * | 11/2008 | F16C 27/02 |
| KR | 10-2012-0017637 | | 2/2012 | |
| WO | 2010/122450 | | 10/2010 | |

\* cited by examiner

FIG. 1

PRIOR ART

SPLIT COMBO BEARING

CROSS-REFERENCE TO RELATED APPLICATION

This application claims priority to and the benefit of Korean Patent Application No. 10-2013-0048490 filed in the Korean Intellectual Property Office on Apr. 30, 2013, the entire contents of which are incorporated herein by reference.

BACKGROUND OF THE INVENTION (a) Field of the Invention

The present invention relates to a split combo bearing. More particularly, the present invention relates to a split combo bearing including a thrust bearing and a radial bearing.

(b) Description of the Related Art

In parts (rotor shaft and moving shaft) that make motions such as rotation or reciprocation, various types of bearings are provided to solve problems such as wear or damage of the parts, noise, and waste of energy due to friction that may be generated in the motions of the parts. The bearing on which loads are applied perpendicular to the rotational axis is called a radial bearing or a journal bearing (for sliding bearings) and the bearing on which loads are applied in parallel with the rotational axis (that is, axially) is called a thrust bearing. Most bearings called thrust bearings and rolling bearings are classified into a thrust bearing on which axial loads are applied at over 45 degrees and a radial bearing in the other cases.

A technology regarding a radial bearing is disclosed in International Patent Publication No. 2010-122450 ("A MAGNETIC BEARING, A ROTARY STAGE, AND A REFLECTIVE ELECTRON BEAM LITHOGRAPHY APPARATUS", 2010.10.28), and a technology regarding a thrust bearing is disclosed in U.S. Patent Publication No. 2009-0039740 ("Magnetic Bearing", 2009 Feb. 12).

Further, recently, a divisional type of power generation technology has been increasingly commercialized all over the world due to an increase in costs for initial installations because the cost per kilowatt for transmitting power is consumed in a large amount in centralized systems, and there is a need for inexpensive basic structures that are installed to distribute generated power to consumers. With this tendency, micro gas turbines that are small gas turbines capable of generating power directly at the sites are increasingly used. Micro gas turbines or micro turbines, which are small-sized gas turbines, generally have output of less than 1 kW or of hundreds of watts. Those micro gas turbines are being increasingly developed and used for divisional types of power and small-scaled cogeneration systems because of technical advantages and the environmentally-friendly characteristic.

It has been known that the rotor shafts of the small devices such as the micro gas turbines usually rotate at high speeds of 10,000~400,000 rpm in order to achieve desired output. Radial bearings and thrust bearings are necessary for the small devices as well. In particular, for small high-speed rotors such as the micro gas turbine of which the necessity and the actual use are increasing, there is an increasing need of bearings that can be reduced in size and weight, satisfying the conditions of non-contact type and no oil supply, in addition to the conditions required for bearings, that is, reduction of axial vibration, usability under high-temperature environments, and high durability.

In general, the bearing systems of rotors are composed of a radial bearing that supports radial loads and a thrust bearing that supports axial loads, as described above. However, there is a problem in that the bearing systems on rotors necessarily increase in volume, because the bearings are all separate parts. The larger the volume of bearing systems, the larger the length of rotors becomes, and accordingly, the primary bending mode (critical speed) of the rotors lowers, which causes a problem in that the stability of small rotors is considerably decreased in high-speed rotation.

Further, in the process of separately manufacturing the two types of bearings and assembling them, a specific back plate on a rotor for the thrust bearing is needed and there is a need for a process for meeting the degree of precision in assembling, thereby causing the assembly process to be complicated.

Further, since it is required to install a thrust collar for using a thrust bearing on a rotor, for a high-speed rotor in a small system, when the system is complicated, a bending mode frequency is reduced by a thrust collar and it causes a problem in rotating the rotor at the ultra-high speed.

Figure 1:
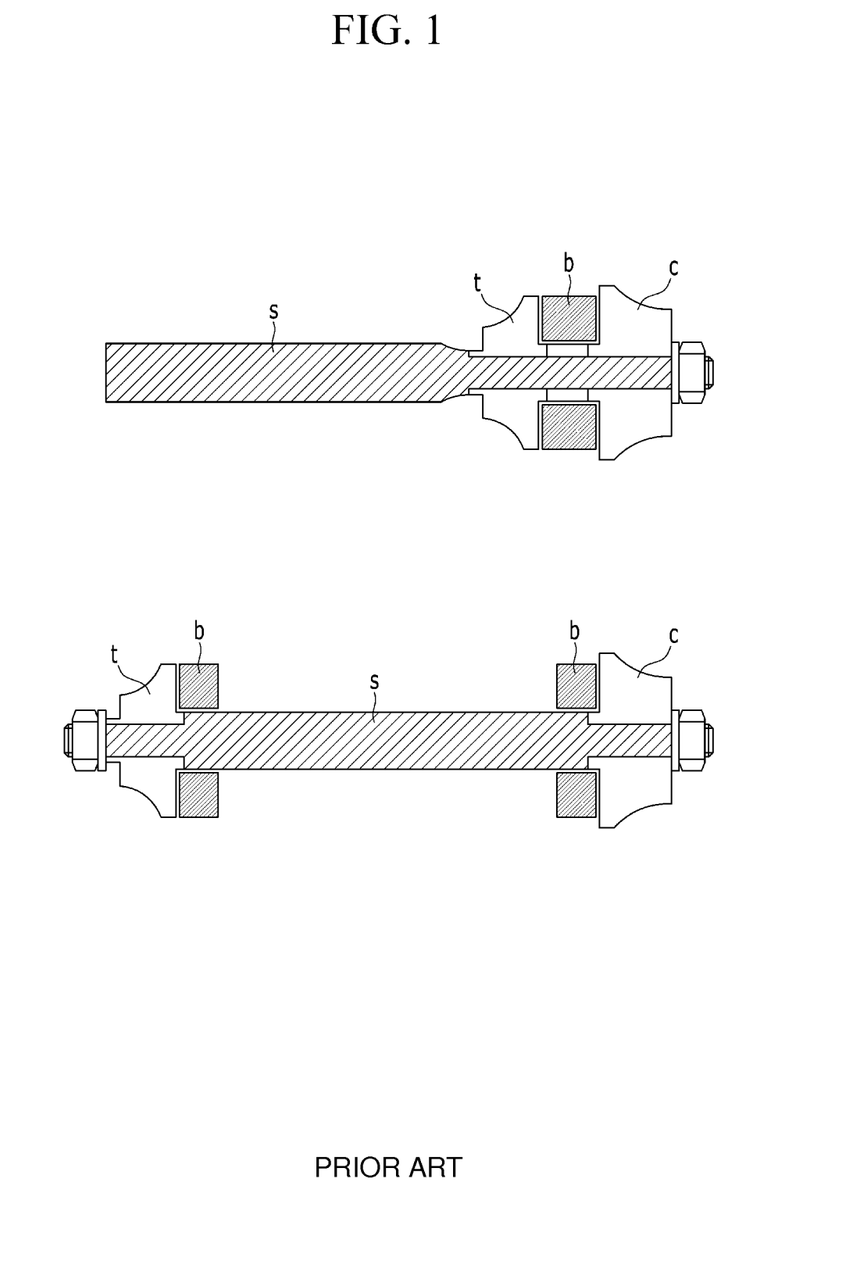
FIG. 1 is a cross-sectional view showing the arrangement of a bearing on an impeller-installed rotor shaft of the related art.

Further, the following problems have been generated with the progress of studies for improving the shapes of small rotors such as those used in the micro gas turbines described above. FIG. 1 is a view showing the configuration of bearings on a rotor shaft assembled with an impeller in the related art. In the related art, a turbine impeller t and a compressor impeller c are separately assembled on a rotor shaft s. That is, the impellers t and c are assembled on an end portion of the rotor shaft s and then fixed by bolts and nuts. In order to assemble the assembly of the rotor shaft and the impellers with a common bearing, the bearing b can be installed while the impellers t and c are installed on the rotor shaft s.

However, in the rotor having this configuration, assembling the high speed rotor shaft with the parts has caused problems such as a high imbalance and low bending mode. As a way of solving the high imbalance and low bending mode during high-speed rotation, a technology for manufacturing a rotor shaft and impellers in one unit, breaking away from the method of separately manufacturing a rotor shaft, a compressor impeller, and a turbine impeller and then assembling them, has been studied in recent years. However, in spite of the design and development of an impeller-rotor shaft-integrated rotor to overcome the problem of high imbalance that is generated when a rotor shaft and impellers are assembled, there is another problem in that it is very difficult to install the bearings of the related art with the impeller-rotor shaft-integrated rotor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a split combo bearing having advantages of allowing for considerable reduction of a space for installing a bearing by achieving functions of a radial bearing and a thrust bearing with one unit.

Further, the present invention provides a split combo bearing that has a split structure to be able to be assembled with an impeller-rotor shaft-integrated rotor on which a bearing cannot be installed because impellers and a rotor shaft are integrally formed.

An exemplary embodiment of the present invention provides a split combo bearing including: a damper body that has a through-hole through which a rotor shaft passes and is composed of two or more first separate bodies that are axially separated; a cover that covers both axial sides of the damper body and a predetermined area of the outer circumference of the damper body and is composed of two or more second separate bodies that are radially separated to correspond to the first separate bodies; a thrust bump that is fixed to the side of the cover, which faces an impeller on a rotor shaft, is arranged circumferentially around the through-hole, and is formed by bending a thin plate with a wavy surface; a thrust top foil that is axially fixed to the outermost side of the thrust bump and is formed by bending a thin plate; and a radial top foil that is formed to cover the rotor shaft, is disposed between the outer side of the rotor shaft and the inner side of the through-hole of the damper body, has an insertion of which one end is installed in any one of gaps between the first separate bodies and the second separate bodies of the damper body, and is formed by bending a thin plate.

The damper body may be made of a metal mesh material.

The cover may be made of a metal.

The thrust bump may be formed such that one or more wedged portions formed at one circumferential end in a plurality of wedged portions on the surface are inclined in a predetermined direction, and the thrust top foil may be inclined to correspond to the inclined direction of the thrust bump.

Two or more unit collars each composed of the thrust bump and the thrust top foil may be radially arranged.

The thrust bumps of the unit collars may be inclined and fixed in the same direction.

The split combo bearing may further have a gap filler formed in a thin plate shape and installed in a gap where the insertion is not installed in gaps between the separate bodies.

The gap filler may be formed in the same thickness or made of the same material as the radial top foil.

The split combo bearing may surround the rotor shaft, and may further include a housing receiving the damper body, the cover, the thrust top foil, and the radial top foil.

The rotor may be an impeller-rotor shaft-integrated rotor in which the rotor shaft and one or more impellers are integrated, and the outer diameter of the cover and the inner diameter of the housing may be larger than the outer diameters of the impellers.

According to exemplary embodiments of the present invention, to replace a radial bearing and a thrust bearing of a rotor in the related art, a combo bearing of the present invention that can achieve the functions of the radial bearing and the thrust bearing as a single unit is provided, such that there is an effect that it is possible to reduce the length of a rotor by as much as a length needed for ensuring space for the two different types bearings in the related art. Further, as the length of a rotor is minimized, there is also the effect that the volume of the entire system can be reduced.

Further, the split combo bearing of the present invention has the effect of solving the problem of difficulty of disposing a bearing because the bearing cannot be installed from any one side on an impeller-rotor shaft-integrated rotor in which impellers are integrally formed in the related art. That is, since the present invention provides a split structure, it can be easily installed on not only an impeller-rotor shaft-integrated rotor, but also on any rotors with a complicated shape.

Further, in the combo bearing of the present invention, since the length of the rotor is reduced in comparison to the related art, a critical speed due to a bending mode of the rotor increases in comparison to the related art, such that the operation speed range where the rotor can stably operate can be increased.

In detail, in the combo bearing of the present invention, a cover that can be welded covers the outer side of a metal mesh damper and then an airfoil thrust bearing is attached by welding, such that a metal mesh foil radial bearing and an airfoil thrust bearing can be integrally formed and deterioration of performance of the metal mesh damper can be prevented.

Further, according to the combo bearing of the present invention, two systems are assembled into one part, such that the system is simplified, the manufacturing process is simplified, the management cost is reduced, and mechanical stability is ensured with improved durability against high-temperature corrosion.

DETAILED DESCRIPTION OF THE EMBODIMENTS

A split combo bearing including an airfoil thrust bearing and a metal mesh foil radial bearing according to the present invention is described hereafter in detail with reference to the accompanying drawings.

Figure 2:
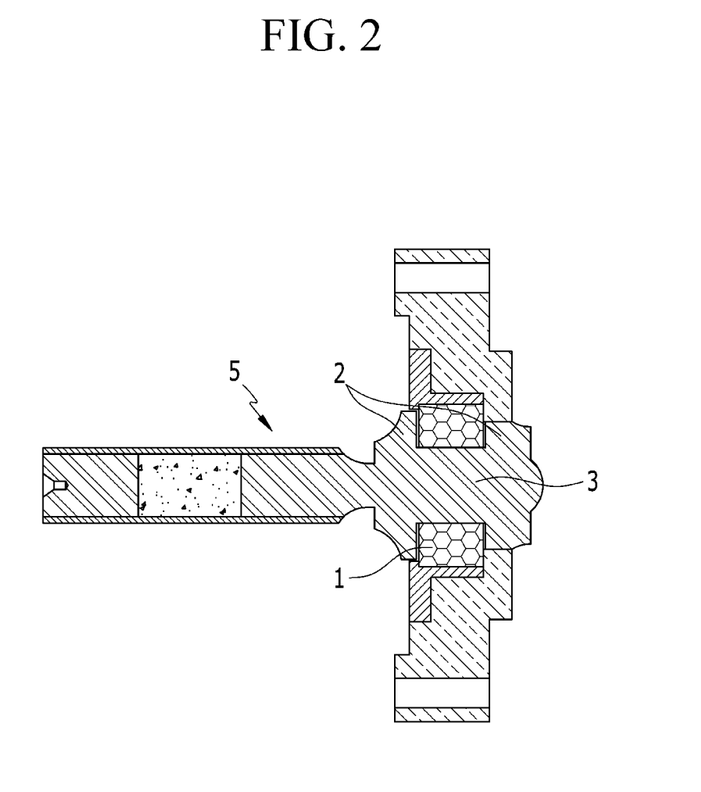
FIG. 2 is a cross-sectional view showing the arrangement of a bearing on an impeller-rotor shaft-integrated rotor.

FIG. 2 shows the arrangement of an impeller-rotor shaft-integrated rotor and a bearing. As shown in FIG. 2, the impeller-rotor shaft-integrated rotor has a structure in which a rotor shaft 3 and one or more impellers 2 are integrated.

In detail, FIG. 2 shows an impeller-rotor shaft-integrated rotor 5 that is used for a micro gas turbine for power generation, in which the impellers are composed of a compressor impeller at the left of the bearing and a turbine impeller at the right of the bearing 1. The rotor shaft 3 and the impellers 2 are integrally formed, and a magnetic body is disposed at the shank of the rotor shaft 3 to be used for power generation and covered with a sleeve.

The present invention provides a split combo bearing 10 that can be easily disposed at a position where it is difficult disposed a bearing because the shape of a rotor is complicated, for example, at the position where the bearing 1 is disposed in FIG. 2. Obviously, the split combo bearing provided by the present invention is easily disposed and an airfoil thrust bearing and a metal mesh foil radial bearing are integrally formed, such that manufacturing and assembling are easy and the length of a rotor that was unnecessarily long to ensure a space for installing two kinds of bearings can be reduced.

FIG. 2 is provided as an example to help understanding, and the split combo bearing according to the present invention is not necessarily limited to the configuration where the bearing 10 is installed on the rotor, as in FIG. 2.

FIGS. 3 to 6 show a split combo bearing according to an exemplary embodiment of the present invention. Referring to FIGS. 3 to 6, the split combo bearing 10 of the present invention largely includes a damper body 100, a cover 200, a thrust bump 300, a thrust top foil 400, and a radial top foil 500.

Figure 3:
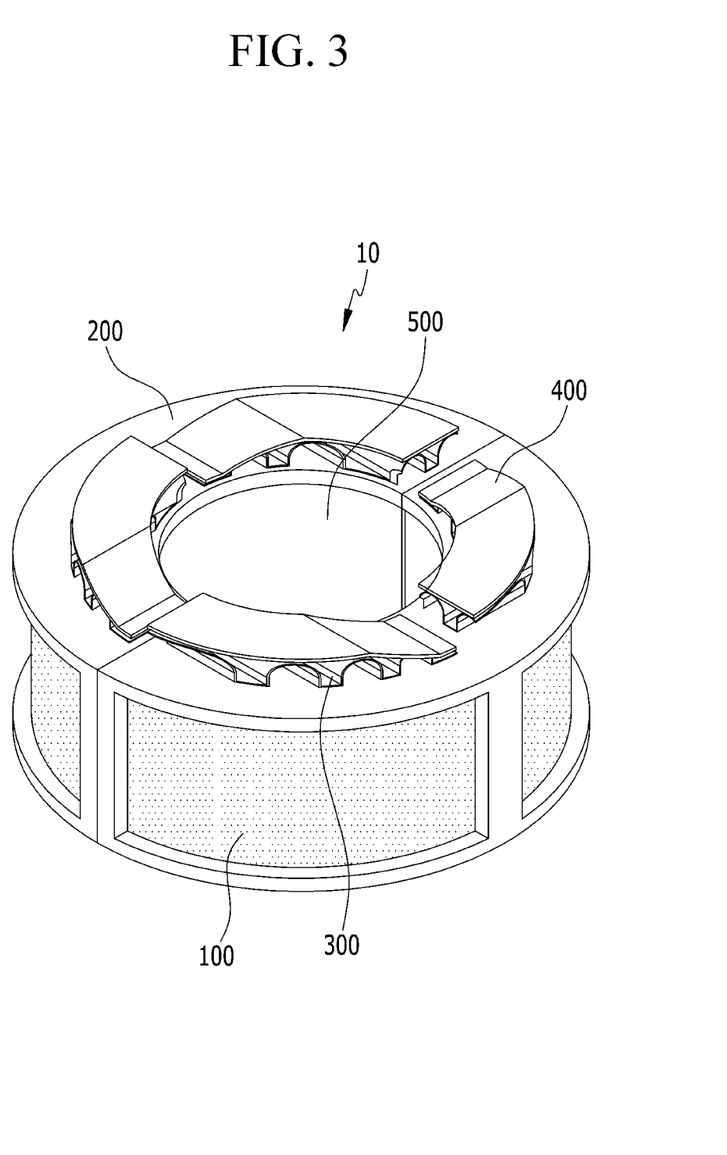
FIG. 3 is a perspective view of a split combo bearing according to an exemplary embodiment of the present invention.
Figure 4:
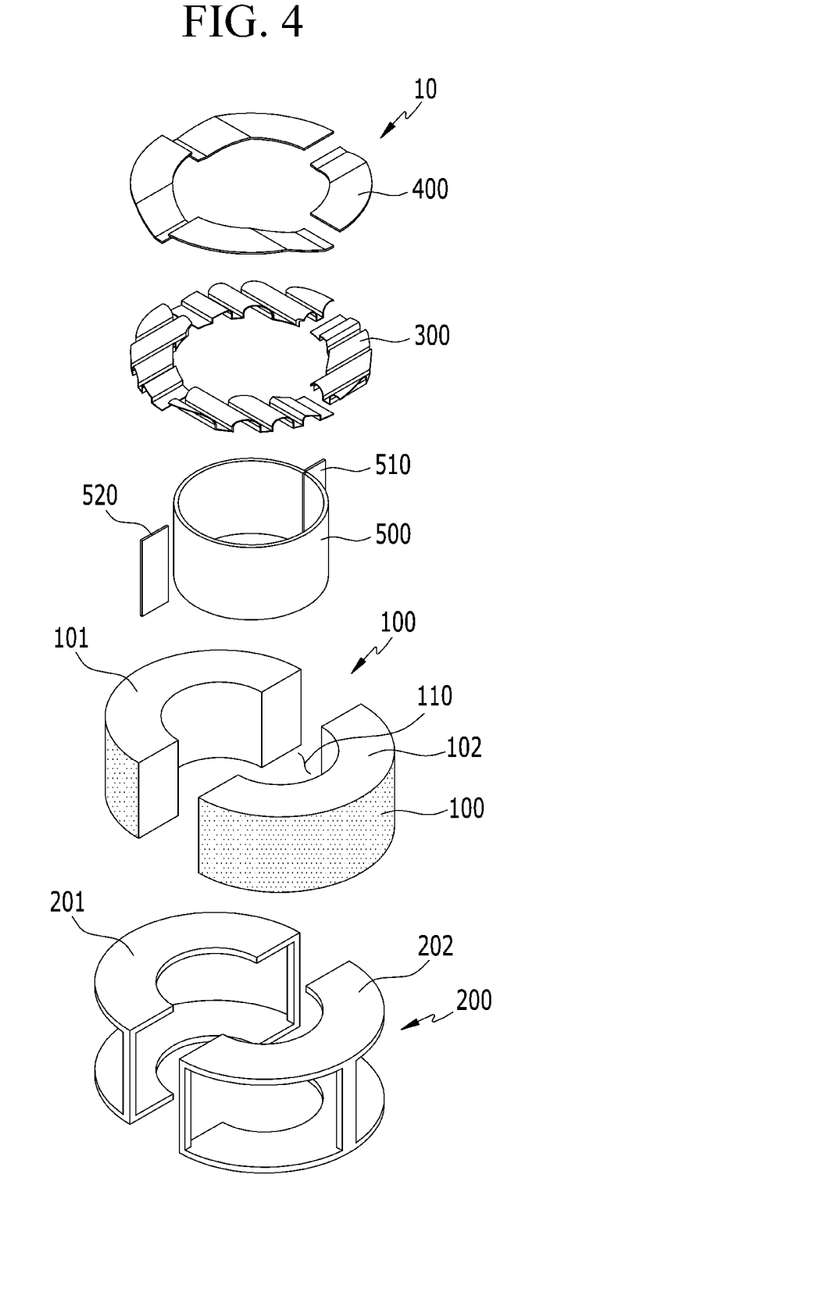
FIG. 4 is an exploded perspective view of the split combo bearing according to an exemplary embodiment of the present invention.

The damper body 100 has a through-hole 110 at the center through which a rotor shaft passes, and is composed of two or more first separate bodies 101 and 102 formed by radially dividing the body to be separated. The damper body 100 may be made of a metal mesh material.

The cover 200 can cover both axial sides of the damper body 100 and a predetermined area of the outer circumference of the damper body 100. The cover 200 is made of a metal that can be welded such as stainless steel so that an airfoil thrust bearing can be attached by welding, and accordingly a metal mesh foil radial bearing and an airfoil thrust bearing can be integrally formed.

In particular, the cover 200 is composed of two or more second separate bodies 201 and 202 that are radially divided to be separated, corresponding to the first separate bodies 101 and 102 of the damper body 100, and the second separate bodies 201 and 202 can cover a predetermined area at the joint of the first separate bodies 101 and 102.

The thrust bump 300 is fixed to the side of the cover 200 which faces the impeller on a rotor shaft by welding, is arranged circumferentially around the through-hole 110, and is formed by bending a thin plate with a wavy surface.

As described above, the thrust bump 300 may be integrally formed with the cover 200 by welding. In particular, since the thrust bump 300 is formed by bending a thin plate in a wave pattern, it can function as an elastic body that absorbs some of axial vibration.

The thrust top foil 400 is fixed by axial welding in contact with the outermost side of the thrust bump 300, and is formed by bending a thin plate.

The thrust top foil 400 is a thrust contact surface exposed to the shaft to be supported by the split combo bearing 10 of the present invention, with the surface coated to reduce a friction coefficient, and is in contact with the thrust bump 300 to produce air pressure such that non-contact rotation can be achieved.

Figure 5:
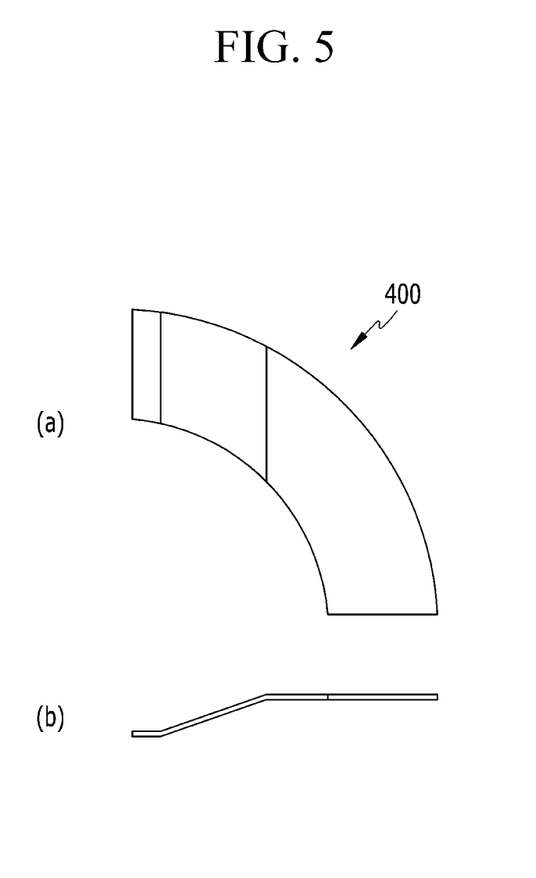
FIG. 5 is a view showing a thrust top foil of the split combo bearing of the related art, in which (a) is a plan view and (b) is a side view.
Figure 6:
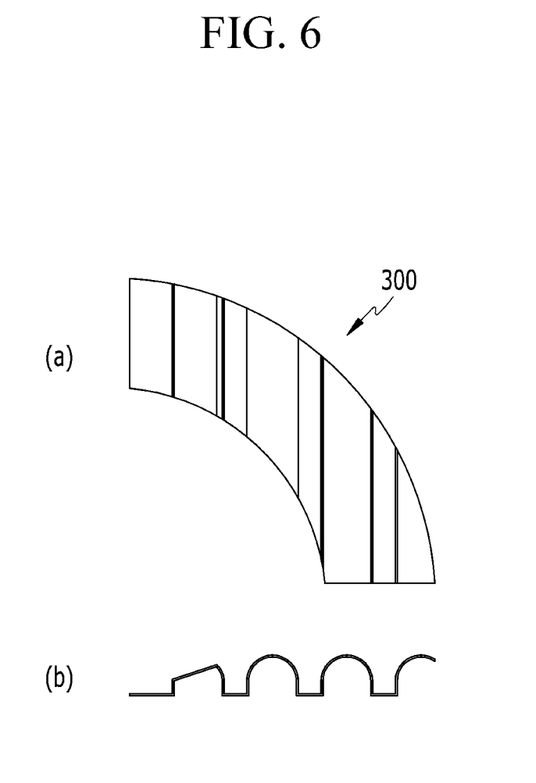
FIG. 6 is a view showing a thrust bump of the split combo bearing of the related art, in which (a) is a plan view and (b) is a side view.

In particular, in the split combo bearing 10 of the present invention, the thrust bump 300 is formed such that one or more wedged portions formed at one circumferential end in a plurality of wedged portions on the surface are inclined in a predetermined direction, and the thrust top foil 400 is inclined to correspond to the inclined direction of the thrust bump 300.

In other words, the thrust bump 300 is wavy, as shown in FIG. 6, with one or more wedged portion protruding at one end inclined to a side. Further, as shown in FIG. 5, the thrust top foil 400 fixed in contact with the thrust bump 300 can also be inclined in the direction corresponding to the thrust bump 300. The inclination direction is the rotation direction of the impeller integrally formed with the rotor shaft.

Accordingly, the thrust top foil 400 generates air pressure between the back plates of impellers integrally formed with the rotor shaft and the thrust top foil 400, such that the bearing 10 can effectively absorb vibration while supporting the axial load.

The radial top foil 500 is formed by bending a thin plate to surround the rotor shaft, and is disposed between the outer side of the rotor shaft and the inner side of the through-hole 110 of the damper body 100. In detail, the radial top foil 500 has a substantially circular cross-section to surround the rotor shaft, not in a fully closed loop, but with an insertion 510 installed in one of the gaps between the first separate bodies 101 and 102 of the damper body 100.

The insertion 510 can be installed in one of the gaps between the second separate bodies 201 and 202, when the second separate bodies 201 and 202 can cover a predetermined area at the joint of the first separate bodies 101 and 102.

Obviously, since the radial top foil 500 has a substantially circular cross-section with an open portion, it can be disposed at any desired position on the rotor shaft, even if complicated protruding parts such as an impeller are formed around the rotor shaft.

The inner side of the radial top foil 500 is the radial contact surface exposed to the outer side of the rotor shaft, and it is possible to achieve non-contact rotation by coating the inner side of the radial top foil 500 to reduce the frictional coefficient and generate air pressure. In the radial top foil, the principle of non-contact rotation by air pressure is similar to the principle of an airfoil radial bearing, so the detailed description is not provided.

In the split combo bearing 10 of the present invention, it is preferable that two or more unit collars P each composed of the thrust bump 300 and the thrust top foil 400 are radially arranged.

Although four unit collars P are shown in FIGS. 3 and 4, this is just an example, and the number of unit collars P is not limited.

In the split combo bearing 10 of the present invention, when a plurality of unit collars P is provided, the thrust bumps 300 are arranged and fixed in the same direction on each of the unit collars P.

In FIGS. 3 and 4, although four unit collars P are symmetrically formed on both sides of the split combo bearing 10, as described above, the number of unit collars P is not limited, such that the number can be variously changed in accordance with the object or request of users, for example, a different number of unit collars P may be formed on both sides of the split combo bearing 10.

In the split combo bearing 10 according to an exemplary embodiment of the present invention, a metal mesh foil radial bearing and an airfoil thrust bearing are assembled in one unit and the damper body 100 made of a metal mesh absorbs vibration and support the load supported by the split combo bearing 10, such that the shock applied to the thrust bump 300 of the airfoil thrust bearing is distributed and thus the overall durability can be improved.

Further, since the split combo bearing 10 of the present invention includes the cover 20 made of a metal to cover the damper body 100 such that the thrust bump 300 and the thrust top foil 400 of the airfoil thrust bearing can be welded to both sides of the damper body 100, the two kinds of bearings can be integrally assembled.

As described above, since the damper body 100 of the split combo bearing 10 is made of a metal mesh material in the present invention, the shape can be freely selected and it can be easily composed of two or more separate bodies.

Further, since the damper body 100 of the split combo bearing 10 according to an exemplary embodiment of the present invention is composed of the separate bodies, it is possible to dispose the first separate bodies 101 and 102 and the second separate bodies 201 and 202 directly at desired positions from axially outside the rotor shaft. Accordingly, even if the shape of the surface of the rotor shaft is complicated, it is possible to install the split combo bearing 10 of the present invention at a desired position on the rotor shaft. Accordingly, it is possible to more easily install the split combo bearing 10 on a rotor shaft, as compared with the method of disposing a bearing at a desired position on a rotor shaft by pushing it from one end of the rotor shaft in the related art.

Although the first separate bodies 101 and 102 and the second separate bodies 201 and 202 can be formed by dividing the damper body 100 and the cover 200, respectively, into two corresponding bodies, they are not necessarily limited thereto and may be divided into three or more bodies.

In the split combo bearing 10 of the present invention, when the damper body 100 and the cover 200 are each divided into two or more separate bodies, it may include a housing 600 that covers the rotor shaft and receives the damper body 100, the cover 200, the thrust top foil 400, and the radial top foil 500.

Figure 7:
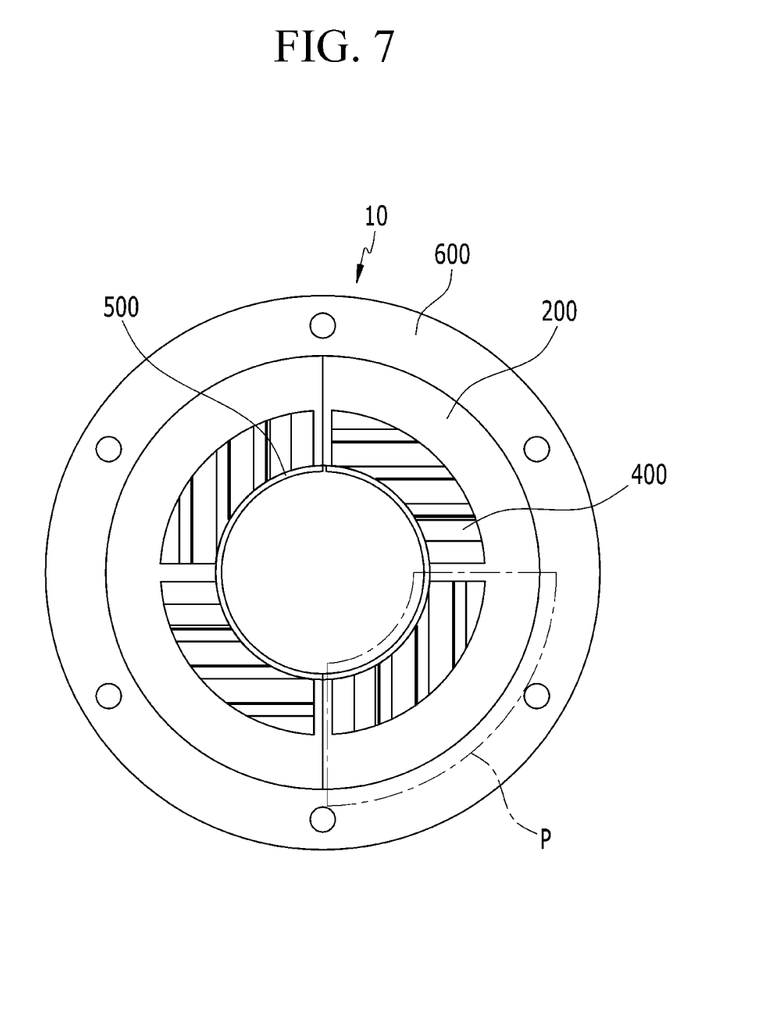
FIG. 7 is a plan view showing a housing installed on the split combo bearing according to an exemplary embodiment of the present invention.

The housing 600 may have a split structure including two or more separate bodies, and may be assembled by bolting or welding. However, the housing 600 of the present invention is not necessarily limited to this configuration, and it may be implemented in one unit, as shown in FIG. 7, in consideration of efficiency of vibration reduction, imbalance, etc.

The housing 600 may be formed in the shape of a ring to be able to receive and fix the damper body 100. Further, the housing 600 may have a flange radially protruding so that the split combo bearing 10 of the present invention can be fixed to another part.

In the present invention, the rotor shaft may be the rotor shaft 3 that is an impeller 2-rotor shaft 3-integrated rotor in which the rotor shaft 3 and one or more impellers 2 are integrally formed, as shown in FIG. 2.

When the inner diameter of the housing 600 is smaller than the impeller 2, the housing 600 cannot be assembled, such that the outer diameter of the damper body 100 and the inner diameter of the housing 600 are made larger than the outer diameter of the impellers 2.

The flange formed on the housing 600 has a plurality of holes such that it can be bolted to another part. That is, the configuration shown in FIG. 7 is only an example, and the housing 600 may be formed in any shape as long as it can receive the damper body 100 and stably fix it.

When the damper body 100 and the cover 200 are divided into two or more first separate bodies 101 and 102 and second separate bodies 201 and 202, respectively, as described above, the portion where the insertion 510 of the radial top foil 500 is fixed in the damper body 100 may be the gaps between the first separate bodies 101 and 101 or second separate bodies 201 and 202.

A gap filler 520 may be installed in the gaps where the insertion 510 is not installed, that is, in the gaps between the first separate bodies 101 and 102 or the second separate bodies 201 and 202, as shown in FIG. 4. The gap filler 520 may be formed in the shape of a thin plate.

In the split combo bearing 10 of the present invention, when the damper body 100 and the cover 200 are configured by combining the first separate bodies 101 and 102 and the second separate bodies 201 and 202 without the gap filler 520, the other gaps except for the gap with the insertion 510 installed remain as empty spaces in the housing 600. When the first separate bodies 101 and 102 and the second separate bodies 201 and 202 are moved, by not being fixed in the housing 600, or deformed due to the empty spaces, the first separate bodies 101 and 102 and the second separate bodies 201 and 202 may lose their roundness.

Accordingly, it is preferable that the gap filler 520 is made in the same thickness or made of the same material as the radial top foil 500 so that it can maintain the separate bodies 101 and 102 and the second separate bodies 201 and 202 stably fixed at the positions.

Accordingly, the combo bearing 10 of the present invention has the effect of reducing the length of a rotor which was increased unnecessarily to ensure spaces for installing two kinds of bearings in the related art. Obviously, as the length of a rotor is minimized, there is also the effect that the volume of the entire system can be reduced.

Further, in the split combo bearing 10 of the present invention, since the length of the rotor is reduced in comparison to the related art, the critical speed due to a bending mode of the rotor increases in comparison to the related art, such that the operation speed range where the rotor can stably operate can be increased.

Further, the split combo bearing 10 of the present invention has the effect of solving the problem that it was difficult to dispose a bearing 1 because the bearing 1 cannot be installed from either side on an impeller-rotor shaft-integrated rotor in which impellers are integrally formed in the related art. That is, since the present invention provides a split structure, it can be easily installed not only on an impeller-rotor shaft-integrated rotor, but also on any rotors with a complicated shape.

The present invention is not limited to the exemplary embodiments and is useful for various cases, and it should be understood that the present invention may be modified in various ways without departing from the scope of the present invention by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A split combo bearing, comprising:
    a damper body that has a through-hole through which a rotor shaft passes and is composed of two or more first separate bodies that are axially separated;
    a cover that covers both axial sides of the damper body and a predetermined area of the outer circumference of the damper body and is composed of two or more second separate bodies that are radially separated to correspond to the first separate bodies;
    a thrust bump that is fixed to the side of the cover, which faces an impeller on a rotor shaft, is arranged circumferentially around the through-hole, and is formed by bending a thin plate with a wavy surface;
    a thrust top foil that is axially fixed to the outermost side of the thrust bump and is formed by bending a thin plate; and
    a radial top foil that is formed to cover the rotor shaft, is disposed between the outer side of the rotor shaft and the inner side of the through-hole of the damper body, has an insertion of which one end is installed in one of gaps between the first separate bodies and the second separate bodies, and is formed by bending a thin plate.

2. The split combo bearing of claim 1, wherein the damper body is made of a metal mesh material.

3. The split combo bearing of claim 2, wherein the cover is made of a metal.

4. The split combo bearing of claim 3, wherein one or more wedged portions formed at one circumferential end in a plurality of wedged portions on the surface of the thrust bump are inclined in a predetermined direction, and
    the thrust top foil is inclined to correspond to the inclined direction of the thrust bump.

5. The split combo bearing of claim 4, wherein two or more unit collars each composed of the thrust bump and the thrust top foil are radially arranged.

6. The split combo bearing of claim 5, wherein the thrust bumps of the unit collars are inclined and fixed in the same direction.

7. The split combo bearing of claim 3, comprising
a gap filler that is formed in the shape of a thin plate and fixed to the gaps of the first separate bodies and the second separate bodies where the insertion is not installed.

8. The split combo bearing of claim 7, wherein the gap filler is made with the same thickness or made of the same material as the radial top foil.

9. The split combo bearing of claim 3, surrounding the rotor shaft and comprising a housing receiving the damper body, the cover, the thrust top foil, and the radial top foil.

10. The split combo bearing of claim 9, wherein the rotor shaft is a rotor shaft of an impeller-rotor shaft-integrated rotor in which the rotor shaft and one or more impellers are integrated, and
an outer diameter of the cover and an inner diameter of the housing are larger than outer diameters of the impellers.

* * * * *